(12) United States Patent
King

(10) Patent No.: US 6,471,858 B1
(45) Date of Patent: Oct. 29, 2002

(54) WATER TREATMENT DISPENSERS

(76) Inventor: Joseph A. King, 142 Chevy Chase Dr., Wayzata, MN (US) 55396

( * ) Notice: Subject to any disclaimer, the term of this patent is extended or adjusted under 35 U.S.C. 154(b) by 0 days.

(21) Appl. No.: 09/489,170

(22) Filed: Jan. 21, 2000

(51) Int. Cl.[7] .................................................. C02F 1/76
(52) U.S. Cl. ...................... 210/192; 210/199; 210/206; 210/209; 210/266; 210/282; 422/264; 422/278
(58) Field of Search ................................. 210/753, 754, 210/756, 758, 764, 101, 169, 192, 198.1, 199, 206, 209, 266, 282; 422/261, 264, 276–278

(56) References Cited

U.S. PATENT DOCUMENTS

| | | | | |
|---|---|---|---|---|
| 3,595,786 A | * | 7/1971 | Horvath et al. | 210/198.1 |
| 3,846,078 A | | 11/1974 | Brett | 23/267 |
| 4,540,489 A | * | 9/1985 | Barnard | 210/287 |
| 4,780,197 A | | 10/1988 | Schuman | 210/136 |
| 5,656,159 A | * | 8/1997 | Spencer et al. | 210/206 |
| 5,855,777 A | * | 1/1999 | Bachand et al. | 210/205 |
| 5,976,385 A | * | 11/1999 | King | 15/1.7 |
| 5,993,753 A | * | 11/1999 | Davidson | 210/205 |
| 6,004,458 A | * | 12/1999 | Davidson | 210/206 |
| 6,162,407 A | | 12/2000 | Pihl | 422/266 |
| 6,210,566 B1 | * | 4/2001 | King | 210/169 |
| 6,217,754 B1 | * | 4/2001 | Ros | 210/169 |
| 6,217,892 B1 | * | 4/2001 | King | 424/405 |
| 6,325,926 B1 | * | 12/2001 | Hansen | 137/268 |
| 6,328,900 B1 | * | 12/2001 | King | 210/169 |
| 6,358,425 B1 | * | 3/2002 | King | 137/268 |

FOREIGN PATENT DOCUMENTS

| | | |
|---|---|---|
| FR | 1184324 | 7/1959 |
| WO | WO 99 24366 | 5/1999 |

* cited by examiner

Primary Examiner—Peter A. Hruskoci
(74) Attorney, Agent, or Firm—Jacobson & Johnson

(57) ABSTRACT

A dispenser apparatus for cantileverly mounting in an off-line condition in an axially component of a water system with the dispenser apparatus carrying a water treatment composition therein that can be released into a water system with one embodiment of the dispenser apparatus including a pair of replaceable containers for holding a water treatment composition with the containers serially located so that the water flowing into one container flows into the second container with the second container removable from the first container so that the second water treatment composition can be replenished without having to replenish the water treatment composition in the first container.

19 Claims, 3 Drawing Sheets

WATER TREATMENT DISPENSERS

FIELD OF THE INVENTION

This invention relates generally to water treatment and, more specifically, to a water treatment device having a water treatment composition therein with the water treatment device cantileverly mountable to a water system housing to provide water treatment to water circulating through the water system housing.

BACKGROUND OF THE INVENTION

The use of dispensers to hold and dispense solid water treatment compositions is known in the art. Typically, a container holds the water treatment composition in an inline position while water is forced to circulate through the water treatment composition. Water treatment compositions such as chlorine or bromine are used to kill the bacteria in the water system. In other water treatment systems ions of heavy metals are used to kill bacteria and algae in the water. Generally, the dispensers are permanently built into the water system; however, in other instances it becomes necessary to retrofit a water system with water treatment dispensers. The present invention provides a dispenser apparatus that can be cantileverly mounted in an off-line mode into the housing of a water system. The water treatment dispenser apparatus can be cantileverly mounted to a new or an existing water system in either a single or a dual water treatment mode. In the dual water treatment mode the two water treatment compositions can be serially arranged within the dispenser apparatus so that the water first comes into contact with one of the water treatment composition and then comes in contact with the second water treatment composition with at least one of the water treatment compositions replaceable independently of the other.

SUMMARY OF THE INVENTION

A dispenser apparatus for cantileverly mounting in an off-line condition of a water system with the dispenser apparatus carrying a water treatment composition therein that can be released into the water treatment system. One embodiment of the dispenser apparatus includes a pair of replaceable containers for holding a water treatment composition with the containers serially located so that the water flowing into one container flows into the second container with the second container removable from the first container so that a second water treatment composition located therein can be replenished without having to replenish the water treatment composition in the first container.

DESCRIPTION OF THE PREFERRED EMBODIMENT

Figure 1:
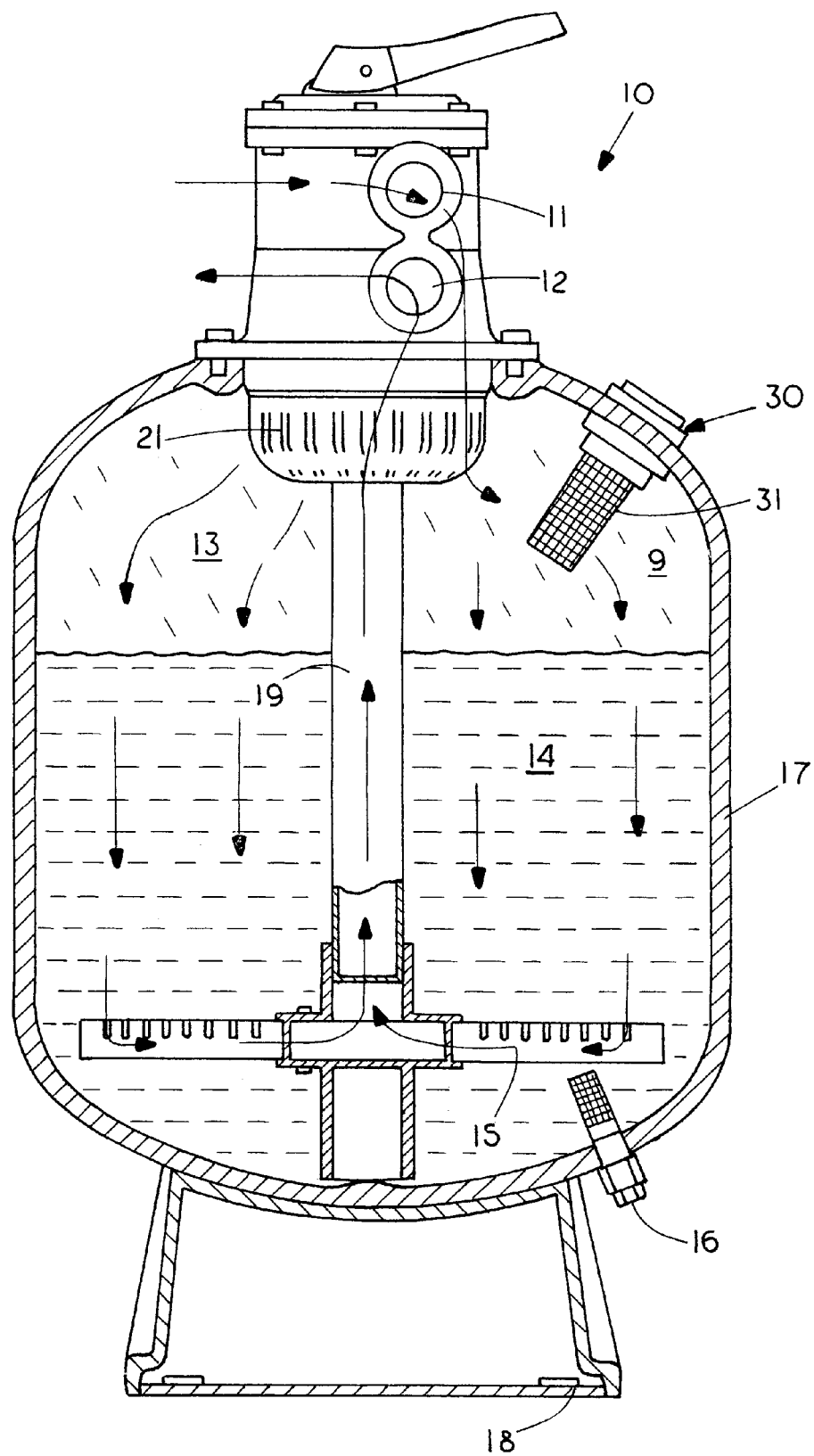
FIG. 1 is a cross sectional view of a sand filter having a dual water purification system mounted therein.

In order to illustrate the use of the dispenser apparatus of the present invention in an auxiliary component of a water system reference should be made to FIG. 1 which shows a cross-sectional view of an auxiliary component comprising a sand filter 10 that is commonly used in conjunction with a water system. Sand filter 10 is used in systems where humans come into contact therewith such as in spa or pool systems. A dispenser apparatus 30 is cantileverly mounted to housing 17 of sand filter 10. Generally, sand filters 10 are used to remove debris from a water system and comprise a container 17 having a base 18 for placement of the unit on a support structure. Located on top of sand filter 10 is a water inlet 11 and a water outlet 12 that connect to the water system. Typically, the sand filter 10 contains a bed of sand 14 in the bottom thereof with the sand positioned so that water flowing in the inlet 11 must flow through water outlet 12 before being discharged from the sand filter which removes debris and the like in the water.

In operation of the water system using sand filter 10, water 9 flows in inlet 11 as indicated by arrows and downward through a dispersal chamber 21 and into upper portion of chamber 13 which contains water 9. The water 9 then flows downward through the bed of sand 14 until it reaches the return port 15. The water enters return port 15 and flows up pipe 19 until it is discharged from outlet 12. Thus the water entering the sand filter 10 must pass through the bed of sand 14 to remove debris in the water. It is with such an auxiliary component of a water system that one can mount the present invention to provide for continual water treatment.

In the present invention the dispenser apparatus 30 is cantileverly mounted in an off-line position in housing 17 of the sand filter 10 with the dispenser apparatus 30 having a cylindrical container 31 that projects inward into the water flowing through the sand filter 10 so that at least a portion of the water comes into contact with the dispenser apparatus 30. Thus, with the present invention it becomes apparent that as the water continues to circulate through sand filter 10 at least a portion of the water comes into contact with the dispenser apparatus 30 to carry the water treatment composition therein into the water to enable the water treatment composition to purify water within the water system.

Figure 2:
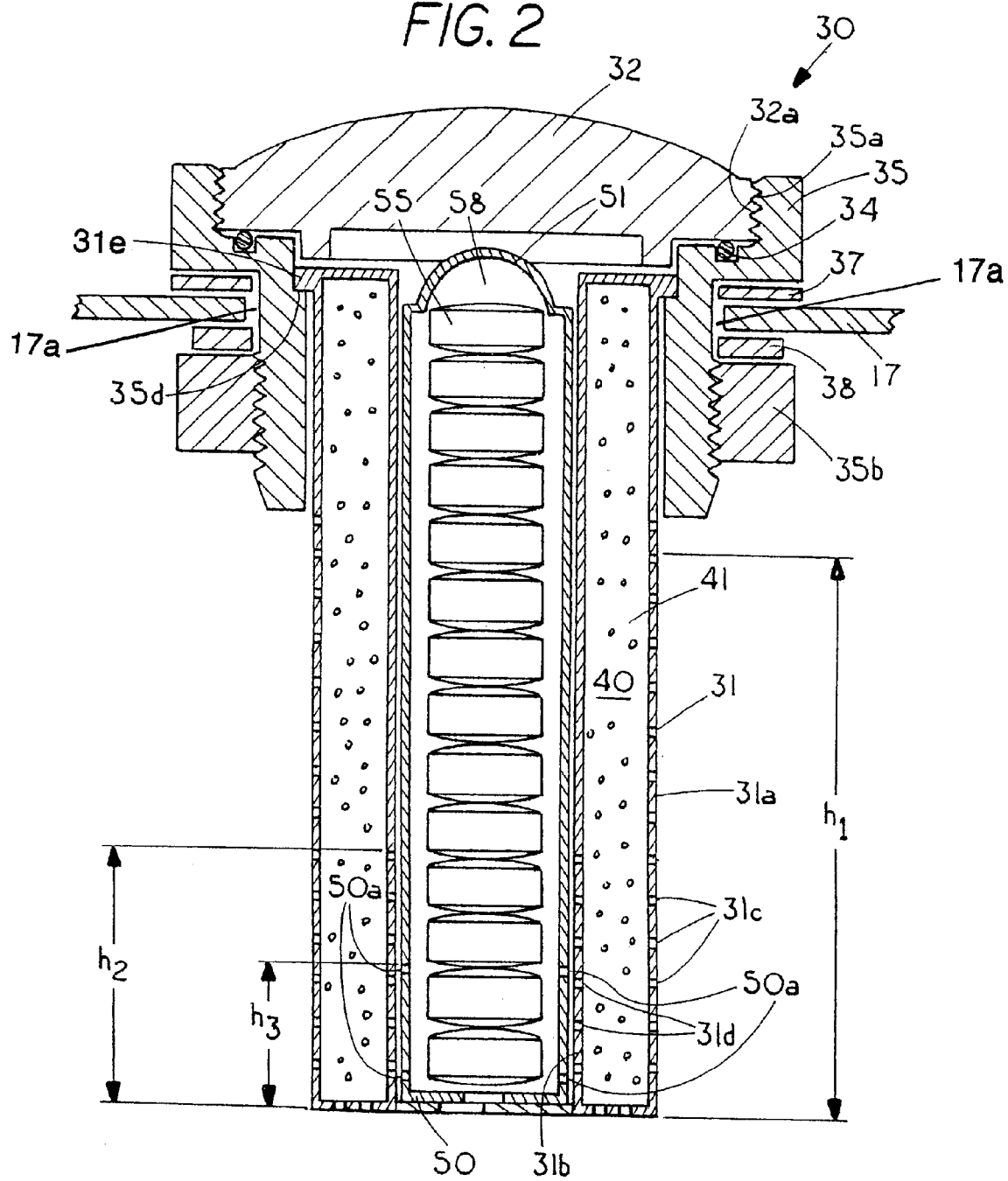
FIG. 2 is a cross sectional front view of a dual water purification system for mounting in the sand filter of FIG. 1.

In order to illustrate the after market installation and operation of dispenser apparatus 30 reference should be made to FIG. 2 which shows a cross sectional front view of a dispenser apparatus 30 cantileverly mounted to the housing 17 of sand filter 10. A hole 17a has been formed in housing 17. Dispenser apparatus 30 includes a first member 35 and a second member 35b for sandwichingly securing dispenser apparatus 30 to housing 17 through hole 17a. A first annular seal 37 extends on one side of housing 17 and a second annular seal extends on the opposite side of housing 17. Member 35 threadingly engages a member 35b which is located on inside of housing 17 to permit one to squeeze seals 37 and 38 around housing 17 to provide a water tight seal between housing 17 and dispenser apparatus 30.

Dispenser apparatus 30 includes a removable cap 32 having threads 32a that enables cap 32 to threadingly engage threads 35a on member 35 for removal of cap from member 35. A sealing ring 34 fits between cap 32 and member 35 to provide a water tight seal between cap 32 and member 35.

Connected to member 35 is an annular container 31 that extends in cantilever fashion into chamber 13 (shown in FIG. 1). Container 31 has an outer face 31a and an inner face 31b spaced therefrom to create an annular chamber 40 therebetween. A suitable first water treatment composition 41 is an ion yielding material selected from one or more of the ion yielding materials that yield ions of silver, copper, zinc or tin in the presence of water. In one example of such a water treatment composition silver chloride is carried by a carrier which is inert or a carrier that can be used to maintain the pH of the waters such as limestone. In this type of composition silver ions are controllable released. Such a water treatment composition is shown and described in my copending application Ser. No. 09/07,114; titled DELIVERY SYSTEM AND METHOD OF MAKING ARTICLE; filed Nov. 6, 2000 and claiming priority of U.S. Provisional application Ser. No. 60/177,558 which was filed on Jan. 21, 2000.

Annular container 31 includes an upper annular lip 31e that enables lip 31e to be mounted on an annular ledge 35d in member 35 so that the annular container 31 can be supported therein in a cantilever manner that also allows for removal and replacement of annular container 31 when the water treatment composition 41 therein is spent.

Outer face 31a contains a water inlet formed of a plurality of openings 31c located in outer face 31a for ingress of water there in. Openings 31c extend upward a distance denoted by $h_1$ to provide a region where water can flow into the water treatment composition 41. Generally, the greater the height $h_1$ the more water can come into direct contact with the water treatment composition 41. Similarly, inner face 31b includes a plurality of openings 31d that extend a distance $h_2$ to form a water outlet in inner face 31b for egress of water therefrom. The water inlet is spaced from the water outlet to provide a radial path through the water treatment composition 41 located in annular chamber 40 thereby causing water therein to come into contact with the water purification composition 41 and assist in dispensing the water treatment composition 41. Thus with a water treatment composition 41 located in annular chamber 40 it is apparent that the water treatment composition 41 can be dispensed into the chamber 13 by the water flowing thorough annular chamber 40.

In order to provide serial treatment of the water, dispenser apparatus 10 includes a removable cylindrical container 50 containing a second water treatment material. The container 50 is centrally positioned with respect to the inner face 31b of annular container 31. Removable container 50 is spaced sufficiently far from inner face 31b so that when cap 32 is removed the inner container 50 can be grasped by handle 51 and lifted therefrom so that removable container 50 can replaced with another removable container containing a fresh batch of water treatment material without having to remove container 31.

FIG. 2 shows that the removable container 50 includes a central cylindrical compartment 51a with the container 50 having plurality of openings 50a located at the lower portion thereof which extend upward container 50 a distance $h_3$. In the embodiment shown the second water treatment material can comprise an oxidizer 55 in tablet form. Suitable oxidizers 50 are chlorine or bromine which can be maintained in solid from and provide effective bacteria kill.

A plurality of openings 50a, which are located in the removable container 50, some of which form an inlet for water to flow therethrough and some of which form and outlet for discharge of water therefrom, enable at least some of the water flowing though the annular chamber 41 to flow through both the minerals in chamber 41 and the oxidizer 55 to thereby provide for dual water purification.

A feature of the present invention is that the oxidizer taplets 55 in the lower portion of removable container 50 are in contact with the water that flows therethrough while an air pocket 58 in the top of the chamber prevents water from flowing upward to the stacked tablets 55. That is, the cap 32 forms a water tight seal so that air located within the container 50 remains in container 50 if the dispenser apparatus is mounted in a condition where the central axis 30a is in a vertical or near vertical condition with the cap 32 at the topmost position. Consequently, an air pocket is maintained in the top of removable container so that as the lower tablets 55 in the removable container 50 are consumed fresh tablets 55 fall downward from the air pocket in the upper portion of container 50 into the lower portion of container 50 where they come into contact with the water flowing therethrough. Thus the present invention provides for a replenishing and controlled dispensing of oxidizer tablets 55 into the water by maintaining at least some of the tablets 55 out of the water until others are spent. A further feature of the invention is that the dispenser apparatus shown in FIG. 2 can provide for backup water treatment. That is, once the oxidizer 55 is spent, the water treatment composition 41 in the outer container 31 is still available for water treatment. Consequently, the inner removable container 50 can be removed and replenished with fresh oxidizer. Thus the dispenser apparatus 30 enables the use of water treatment compositions which are consumed at different time intervals. For example, the water treatment composition 41 may take up to six months to consume in a water treatment system whereas the oxidizer 41 may be consumed in only three months. In this scenario the removable container 50 would be supplied with fresh oxidizer after three months thus allowing full use of the water treatment composition in the container 31. At the end of the six month period both the containers 31 and 50 could be removed and replenished.

The present dispenser apparatus 30 is particularly suitable for those systems where one wants to ensure the water remains in a bacteria free state. Typically, the oxidizers such as chlorine or bromine are used to provide an immediate kill of harmful bacteria, while other water treatment compositions such as metal ion yielding materials provide a more controlled and continuous bacteria kill. Consequently, if one of the bacteria killing materials should run out the other is still available to maintain the bacteria killing effectiveness until the other is replaced. Thus the dual bacterial killing systems enhance the safety of the water by helping to ensure that the water is maintained in a bacteria free condition even though one of the water treatment compositions is spent.

Figure 3:
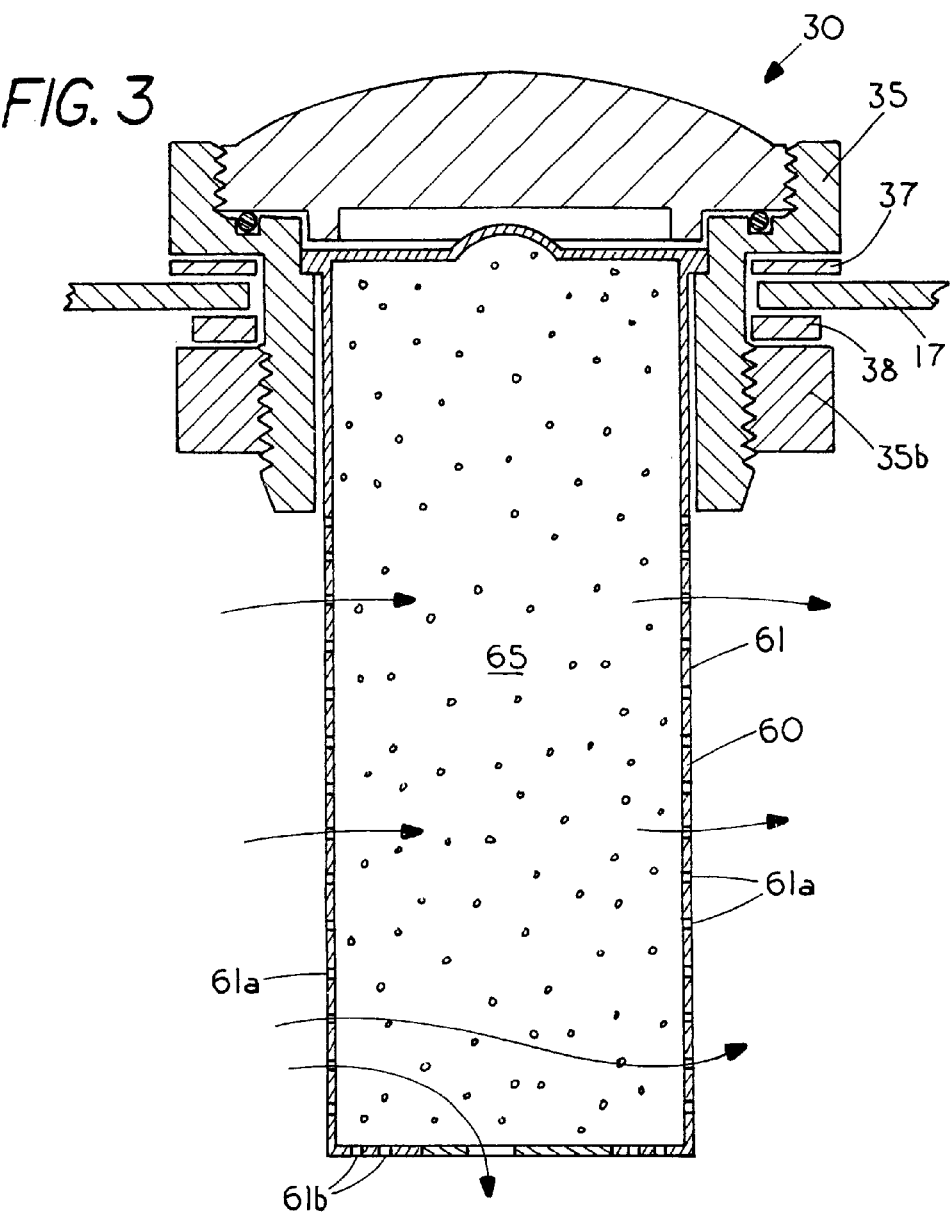
FIG. 3 is a cross sectional view front view of a single water purification system mounted in the sand filter of FIG. 1.

FIG. 3 shows an alternate embodiment of the invention wherein dispenser apparatus 30 cantileverly holds a cylindrical container 60 therefrom that contains a single water treatment composition 65 therein. In the embodiment shown the cylindrical container 60 contains an outer face 60 having a plurality of openings 61a and 61b therein at least some of which function as water inlets and some as water outlets so that water flows as indicated by arrow through the water treatment composition 65. In the embodiment shown in FIG. 3 the entire container 60 is removed and replaced with a fresh batch of water treatment composition 65. With the embodiment of FIG. 3 it is apparent that one can cantileverly mount a water treatment composition in an off-line position within a water system on either an after-market basis or during manufacture of the water system.

Figure 4:
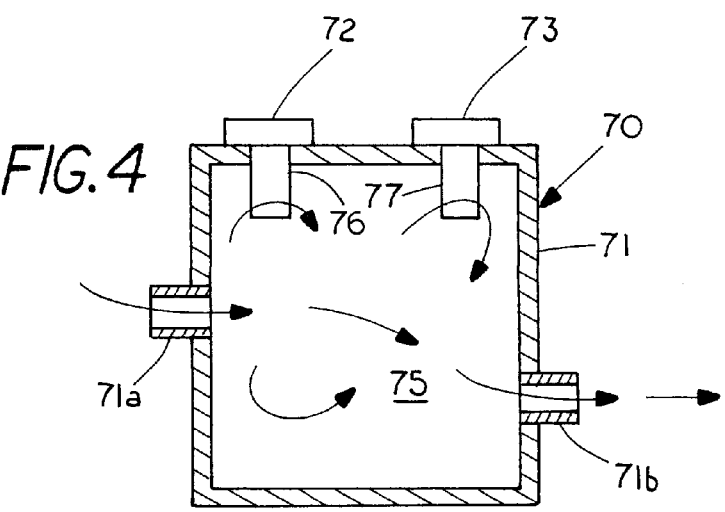
FIG. 4 shows a partial schematic of a water purification system with two dispenser apparatus therein.

To provide for dual water purification mode with a cantileverly mounted dispenser apparatus containing only a single water treatment composition a second dispenser apparatus can be mounted in the water system with the second dispenser apparatus containing a second water treatment composition different from the first water treatment composition. FIG. 4 shows, such a dual dispenser apparatus system 70 having a first dispenser apparatus 72 cantileverly mounted on housing 71 and a second dispenser apparatus 73 cantileverly mounted on housing 71. In this case the dispenser apparatus 72 carries a first container 76 with a first water treatment composition therein and the second dispenser apparatus 73 cantileverly carries a second container which contains a second water treatment composition that is different from the first water treatment composition. In operation water flows through inlet 71a and into chamber 75 wherein it can come into contact with the water treatment composition dispensed from containers 76 and 77 before being discharged out through outlet member 71b.

Thus the present invention includes method of providing off-line water treatment to water treatment system comprising forming a hole in a housing 17 of a water system and mounting a container 31 in a cantileverly fashion therefrom. By placing a water treatment composition 41 in the cantileverly mounted container 31 water can come into contact with the water composition 41 to thereby dispense the water treatment composition 41 into the water system.

While the present invention is shown and described in relation to an auxiliary water system component such as a sand filter in a water system it is apparent that with knowledge of the operation of the present invention of a dispenser apparatus taught herein one could mount the dispenser apparatus in other housings in other portions of the water system

I claim:

1. A dispenser apparatus for cantileverly mounting comprising:
    a pair members for sandwichingly securing the dispenser apparatus to a housing in a cantilever manner;
    an annular container, said annular container having an outer face and an inner face spaced therefrom to create an annular chamber therebetween with said annular chamber extending from said pair of members;
    a first water treatment composition comprising an ion yielding material selected from one or more of the ion yielding materials that yield ions of silver, copper, zinc or tin in the presence of water, said water treatment composition located in said annular chamber;
    a water inlet in said outer face for ingress of water and a water outlet in said inner face for egress of water with the water inlet spaced from the water outlet to provide a path through the first water treatment composition located in said annular chamber;
    a removable container, said removable container positionable within the inner face of said annular container for removal therefrom for replacement thereof;
    a second water treatment material located in said removable container, said second water treatment material comprising an oxidizer selected from the group consisting of chlorine or bromine; and
    a plurality of openings in said removable container some of which form an inlet for water to flow therethrough and some of which form and outlet for discharge of water so that at least some of the water flowing through the annular chamber flows through both the first water treatment composition and the oxidizer to thereby provide for dual water purification.

2. The dispenser apparatus of claim 1 including a sealing member for sealing said members to the housing.

3. The dispenser apparatus of claim 1 wherein the plurality of openings in the removable container extend only partially up said removable container so that when the container is mounted in a vertical or near vertical axis air remains trapped in the removable container to thereby hold at least some of the oxidizer therein from direct contact with the water in the removable container until such time as the oxidizer in a lower portion of the removable container is spent.

4. A dispenser apparatus for attaching to a housing in a cantilever manner comprising:
    a pair of members;
    an outer container, said outer container having an outer face and an inner face spaced therefrom to create a chamber therebetween with said inner face forming an internal compartment therein, said outer container supported by said pair of members in a cantilever fashion;
    a first water treatment composition located in said chamber;
    a plurality of openings in said outer container with at least some of the plurality of openings spaced from one another to provide a fluid flow path through the water treatment composition located in said chamber:
    a removable container, said removable container positionable within the internal compartment of said annular container for removal therefrom for replacement with another removable container;
    a second water treatment material said second water treatment material located in said removable container; and
    a plurality of openings in said removable container some of which form an inlet for water to flow therethrough and some of which form an outlet for discharge of water so that at least some of the water flowing through the chamber flows through both the water purification materials in the chamber and the removable container to thereby provide for dual water purification with the removable container replaceable in the internal compartment separate from replenishment of the water treatment composition in the chamber so when the second water treatment compositions therein is spent the second water treatment composition can be replenished therein to provide for dual water purification.

5. The dispenser apparatus of claim 4 wherein the removable container includes a handle for grasping.

6. The dispenser apparatus of claim 4 wherein the chamber contains silver chloride.

7. The dispenser apparatus of claim 6 wherein the removable container contains chlorine in solid form.

8. The dispenser apparatus of claim 4 wherein the water treatment materials includes an ion yielding material, said ion yielding material is carried on a carrier with the carrier comprising limestone.

9. The dispenser apparatus of claim 4 wherein the water treatment materials includes an oxidizer, the oxidizer comprises a plurality of tablets vertically stacked in said removable container.

10. The dispenser apparatus of claim 4 wherein the first container includes an annular lip and the members includes an annular ledge for supporting the first container in a cantileverly fashion thereon.

11. The dispenser apparatus of claim 4 wherein the housing comprises a sand filter housing with the sand filter housing containing a bed of sand therein for removing debris from water flowing through said sand filter housing.

12. A water treatment system comprising:
    an auxiliary component of a water system, said auxiliary component having a housing, said housing having a chamber for the circulation of water therethrough;
    a dispenser apparatus including a pair of members, said pair of members secured to said housing in a water tight sealing arrangement, said dispenser apparatus including a container, said container cantileverly supported within the auxiliary component by said pair of members, said container having a portion extending out of said dispenser apparatus and into the chamber of said housing for the circulation of water in the chamber through the container;

a removable cap, said removable cap located outside said housing for gaining access to said container located inside said housing;

a water treatment composition located in said container; and a plurality of openings in said container with at least some of the plurality of openings spaced from one another to provide a fluid flow path through the water treatment composition located in said container to thereby enable the auxiliary component to dispense the water treatment composition into the water system.

13. The water treatment system of claim 12 including a second dispenser apparatus containing a second water treatment composition mounted in the auxiliary component.

14. The water treatment system of claim 12 wherein a second dispenser apparatus contains a second water treatment composition different from said first water treatment composition.

15. The water treatment system of claim 14 wherein both of the water treatment compositions are solids.

16. The water treatment system of claim 12 wherein said dispenser apparatus includes a further container.

17. The water treatment system of claim 16 wherein the further container of the dispenser apparatus has a cylindrical body.

18. The water treatment system of claim 16 wherein the further container of the dispenser apparatus is located within the container.

19. The water treatment system of claim 16 wherein the further container of the dispenser apparatus is removable from the dispenser apparatus.

\* \* \* \* \*